(12) United States Patent
Ennis

(10) Patent No.: US 8,013,072 B2
(45) Date of Patent: *Sep. 6, 2011

(54) PARTIALLY HYDROLYZED CHLOROSULFONATED POLYOLEFIN ELASTOMERS

(75) Inventor: Royce E. Ennis, Silsbee, TX (US)

(73) Assignee: DuPont Performance Elastomers L.L.C., Wilmington, DE (US)

( * ) Notice: Subject to any disclaimer, the term of this patent is extended or adjusted under 35 U.S.C. 154(b) by 168 days.

This patent is subject to a terminal disclaimer.

(21) Appl. No.: 12/465,080

(22) Filed: May 13, 2009

(65) Prior Publication Data

US 2010/0292405 A1 Nov. 18, 2010

(51) Int. Cl.
- C08F 8/34 (2006.01)
- C08F 8/42 (2006.01)
- C08F 8/22 (2006.01)
- C08F 8/18 (2006.01)

(52) U.S. Cl. ............ 525/333.9; 525/343; 525/353; 525/354; 525/355

(58) Field of Classification Search ............ 525/333.9, 525/343, 366, 370, 354
See application file for complete search history.

(56) References Cited

U.S. PATENT DOCUMENTS

| 5,668,220 A | 9/1997 | Effler, Jr. et al. |
| 2008/0249253 A1 | 10/2008 | Ennis et al. |

FOREIGN PATENT DOCUMENTS

| JP | H 2-18681 | 8/1986 |
| WO | 2008/123989 A2 | 10/2008 |

OTHER PUBLICATIONS

U.S. Appl. No. 12/401,844, filed Mar. 11, 2009, Ennis.

*Primary Examiner* — Ling Choi
*Assistant Examiner* — Monique Peets

(57) ABSTRACT

At least partially hydrolyzed chlorosulfonated polyolefin elastomers containing 0.5-10 weight percent chlorine and 0.25 to 5 weight percent sulfur are prepared from low density polyethylene or from linear ethylene/alpha-olefin copolymer base resins having a ratio of weight average molecular weight (Mw) to number average molecular weight (Mn) less than 3.5.

11 Claims, No Drawings

US 8,013,072 B2

PARTIALLY HYDROLYZED CHLOROSULFONATED POLYOLEFIN ELASTOMERS

FIELD OF THE INVENTION

This invention relates to partially hydrolyzed chlorosulfonated polyolefin elastomers, more particularly to chlorosulfonated ethylene/alpha-olefin copolymers and chlorosulfonated low density polyethylene polymers having a plurality of —$SO_3H$ groups.

BACKGROUND OF THE INVENTION

Chlorosulfonated polyethylene elastomers and chlorosulfonated ethylene copolymer elastomers have been found to be very good elastomeric materials for use in applications such as wire and cable jacketing, molded goods, automotive hose, power transmission belts, roofing membranes and tank liners. These materials are noted for their balance of oil resistance, thermal stability, ozone resistance and chemical resistance.

Historically, a wide variety of polyolefin polymers, including ethylene and propylene homopolymers and copolymers, have been utilized as the starting polymers (i.e. "base polymers" or "base resins") for manufacture of chlorosulfonated products. The majority of base polymers employed in the manufacture of chlorosulfonated elastomers have been polyethylene types, e.g. low density polyethylene (LDPE), linear low density polyethylene (LLDPE) and high density polyethylene (HDPE). Most of the ethylene homopolymers and copolymers employed to make these elastomers are polymerized by a high pressure free radical catalyzed process or by a low pressure process using Ziegler-Natta or Phillips type catalysts.

Chlorosulfonated elastomers based on highly branched LDPE usually have desirable extrusion and flow properties, but low physical properties. Chlorosulfonated elastomers based on linear HDPE or LLDPE base polymers generally have superior physical properties, but inferior extrusion properties.

U.S. Pat. No. 5,668,220 discloses chlorinated and chlorosulfonated elastomers that contain 20-50 weight percent chlorine and 0.8-2.5 weight percent sulfur. These elastomers are made from ethylene/alpha-olefin copolymers that were polymerized in the presence of a single site or metallocene catalyst. Such ethylene copolymers have improved extrusion or flow properties when compared to polymers having the same molecular weight distribution, but produced using a Ziegler-Natta catalyst.

Japanese Kokai Hei 2[1990]-18681 and US 20080249253 A1 disclose polyolefin ionomers containing —$SO_3M$ groups, where M is a univalent cation. The ionomers are made by reacting a portion of the —$SO_2Cl$ groups on a chlorosulfonated polyolefin with base.

Ethylene based elastomers (e.g. EP and EPDM) are utilized as viscosity modifiers for oils in automotive and industrial applications. These polymers are readily soluble and stable in paraffinic and naphthenic oils whereas more polar polymers (e.g. ethylene acrylic or methacrylic copolymers and highly chlorinated ethylene polymers) are not. Some of these oil additive polymers are also functionalized with reactive groups in order to incorporate stabilizers for oil systems.

It would be desirable to have partially hydrolyzed (i.e. sulfonic acid derivatives) of chlorosulfonated polyolefins having 10 weight percent or less chlorine and a low level of residual crystallinity for use in oil based solutions and emulsions. In some of these applications where solution viscosity must be balanced with oil solubility and polymer thermal stability, it would be desirable to employ copolymers manufactured with a single site catalyst.

SUMMARY OF THE INVENTION

An aspect of the present invention is a chlorosulfonated polyolefin composition comprising at least one chlorosulfonated polyolefin having 0.5 to 10 weight percent chlorine, 0.25 to 5 weight percent sulfur, based on total weight of said chlorosulfonated polyolefin, and a plurality of —$SO_3H$ groups, and wherein said chlorosulfonated polyolefin is produced from a polyolefin base resin selected from the group consisting of i) a low density polyethylene and ii) a linear copolymer comprising copolymerized units of 45 to 80 weight percent ethylene and 55 to 20 weight percent, based on total weight of said linear copolymer, of an alpha-olefin having 3 to 20 carbon atoms, said linear olefin copolymer having a ratio of Mw/Mn less than 3.5.

DETAILED DESCRIPTION OF THE INVENTION

The chlorosulfonated polyolefin elastomer composition of this invention is made by at least partially hydrolyzing with water a portion of the pendant —$SO_2Cl$ groups on at least one chlorosulfonated polyolefin (described hereinafter). Typically only about 10 to 90% (as evidenced by FTIR measurements) of the —$SO_2Cl$ groups react with water to form a plurality of —$SO_3H$ groups, so that the elastomers are termed "partially hydrolyzed". However, completely hydrolyzed compositions are also part of this invention.

Properties of the chlorosulfonated polyolefin elastomer compositions of this invention can be tailored for certain end use applications by employing blends of two or more different (e.g. different comonomers, different molecular weight distributions, etc.) chlorosulfonated polyolefins, each having a plurality of —$SO_3H$ groups.

In the hydrolysis process, at least one chlorosulfonated polyolefin is first dissolved in a solvent such as carbon tetrachloride, tetrachloroethylene or xylene at about 40° C. Optionally, rather than starting with solid chlorosulfonated polymer that must be dissolved, a solution of at least one chlorosulfonated polymer made from the chlorosulfonation process described hereinafter (after degassing) can be utilized. A quantity of demineralized water is added to the solution and the resulting liquid mixed at high shear rate for the desired time. The amount of water added is typically between 5 and 1000 molar equivalents of water per equivalent of —$SO_2Cl$ groups on the polyolefin. Optionally, the water is added in the form of an emulsion comprising a) demineralized water, b) compatibilizer such as a nonionic or ionic surfactant (e.g. sodium lauryl sulfate, Triton® X-100, etc.), sodium stearate, a metal rosin soap, pentaerythritol or quaternary ammonium salt, and optionally c) a solvent (e.g. carbon tetrachloride, tetrachloroethylene or xylene). The resulting polymer may be isolated by a variety of techniques such as precipitation by addition of a non-solvent (e.g. methanol or isopropanol) and then drying recovered polymer in a vacuum oven, or by steam stripping the solution to remove solvent and then drying recovered polymer in a vacuum oven. A preferred isolation process is drum drying where the polymer solution is contacted with a heated drum that flashes the solvent, depositing the polymer as a thin film that is removed to recover the polymer.

The resulting at least partially hydrolyzed chlorosulfonated polyolefin contains a plurality of —$SO_3H$ groups.

Chlorosulfonated polyolefins employed in this invention contain between 0.5 and 10 (preferably between 0.75 and 8, most preferably between 1 and 5) weight percent chlorine and between 0.25 and 5 (preferably between 0.35 and 3, most preferable between 0.5 and 2) weight percent sulfur. These chlorosulfonated polyolefins may be made in a solution process (meaning that the polyolefin base polymer is dissolved in a solvent) by either reaction with $Cl_2$ and $SO_2$ or reaction with sulfuryl chloride ($SO_2Cl_2$). Such processes are disclosed in WO 2008/123989 and in U.S. application Ser. No. 12/401844, filed Mar. 11, 2009.

Polyolefin base resins that may be employed to make the partially hydrolyzed chlorosulfonated polyolefins of the invention include low density polyethylene homopolymers (LDPE) and linear low density ethylene/alpha olefin copolymers.

The LDPE is made in a high pressure process and is characterized by a Melt Index (condition 190° C./2.16 kg) range of 2000 to 1 g/10 minute (min.), preferably 1000 to 10, most preferably 500 to 20 and a density range of 0.920 to 0.890 g/cubic centimeter (cc), preferably 0.915 to 0.895, most preferably 0.910 to 0.900 and a molecular weight distribution >5, preferably >10, most preferably >25.

Some of the linear low density ethylene/alpha-olefin copolymer base resins employed in this invention are commercially available under the trade names Affinity® or Engage® resins from The Dow Chemical Company, Exact® or Vistalon® from ExxonMobil and Tafmer® from Mitsui. Other ethylene/alpha-olefin copolymers containing hexene-1 can also be utilized.

These copolymer base resins comprise 45 to 80 (preferably 50 to 75, most preferably 55 to 75) weight percent copolymerized units of ethylene and 55 to 20 (preferably 50 to 25, most preferably 45 to 25) weight percent of an alpha-olefin. The alpha-olefin may be any unbranched alpha-olefin containing between 3 and 20 carbon atoms. Octene-1, butene-1 and propylene are preferred alpha-olefins. The copolymers may be semi-crystalline or amorphous. Semi-crystalline copolymers are preferred because they are easier to handle.

The ethylene/alpha-olefin copolymers are made in the presence of a single site or metallocene catalyst resulting in a substantially linear copolymer. Due to the catalyst employed in the polymerization process, these copolymers also have a relatively narrow molecular weight distribution, Mw/Mn, of less than 3.5, preferably less 3.0. The density of these copolymers is between 0.85 and 0.91 $g/cm^3$, preferably between 0.860 and 0.900 $g/cm^3$.

The partially hydrolyzed chlorosulfonated polyolefin elastomers of this invention have a variety of end uses such as viscosity modifiers, adhesives, compatibilizers, cured and uncured elastomeric systems, impact modifiers and organosol components.

Compounds of the partially hydrolyzed chlorosulfonated polyolefins of the invention may be formulated to contain curatives and other additives typically employed in traditional chlorosulfonated polyolefin compounds.

Useful curatives include bismaleimide, peroxides (e.g. Di-Cup®), sulfur donors (e.g. dithiocarbamyl polysulfides) and metal oxides (e.g. MgO).

Examples of additives suitable for use in the compounds include, but are not limited to i) fillers; ii) plasticizers; iii) process aids; iv) acid acceptors; v) antioxidants; and vi) antiozonants.

EXAMPLES

Test Methods

Weight percent Cl and S incorporated in chlorosulfonated polyolefins was measured by the Schoniger combustion method (J. C. Torr and G. J. Kallos, *American Industrial Association J.* July, 419 (1974) and A. M. MacDonald, *Analyst*, v86, 1018 (1961)).

The percent of $-SO_2Cl$ groups converted to $-SO_3H$ groups was estimated by utilizing Infrared Spectroscopy and examining the absorption regions for the $-SO_2Cl$, $-SO_3H$ and $-SO_3M$ groups.

All the ethylene/alpha-olefins employed in the following examples contained 45-80 weight percent ethylene and had a ratio of Mw/Mn less than 3.5.

Example 1

An ethylene/propylene copolymer (Tafmer® P0080K, available from Mitsui Chemicals, Inc., having a melt flow rate @230° C. of 8.1 g/10 minute (min.) and a density of 0.870 g/cubic centimeter (cc)) was chlorosulfonated by the process disclosed in U.S. application Ser. No. 12/401844, filed Mar. 11, 2009. The resulting chlorosulfonated polyolefin contained 3.8 wt. % combined chlorine and 1.15 wt % sulfur. This chlorosulfonated polyolefin was used in Examples 1 and 2.

A partially hydrolyzed chlorosulfonated polyolefin elastomer of the invention was prepared by adding 7.5 grams of the chlorosulfonated ethylene propylene copolymer to 142.5 grams of a solvent mixture composed of 90 wt. % carbon tetrachloride and 10 wt. % chloroform and mixed for one hour on a shaker, resulting in a 5 wt. % clear solution of chlorosulfonated polyolefin. The viscosity of this solution was determined to be 33 cps @25° C. This solution was transferred to a 200 ml beaker and stirred at high speed (about 3,000 rpm) with a Silverson homomixer for 1 minute before adding 5 grams of a 20 wt. % aqueous solution of a potassium salt of oleic acid (OCD 607 from Mead Westvaco) (1.2 moles potassium salt per mole of polymer sulfur and 82.2 moles water per mole of polymer sulfur). Mixing was continued at this speed. After 5 minutes total mixing time at 3,000 rpm, the solution of partially hydrolyzed polyolefin had reached 65° C., and was set aside for future use. After cooling to room temperature, the resulting solution viscosity (using a Brookfield viscometer #1 spindle @30 rpm) was determined to be 150 cps @25° C.

A 10 gram portion of the solution was micro-precipitated by pouring the solution gradually into 200 ml of a 1:1:0.5 (vol.) mixture of methanol, acetone and water in a Waring blender. The resulting polymer powder was filtered and washed 3 times with 100 ml aliquots of water to remove any residual potassium oleic acid salt. After drying for 1 hour at 121° C., a thin pressed film of the resulting polymer showed infrared bands at 1014 $cm^{-1}$ and 1130 $cm^{-1}$, indicating conversion of the sulfonyl chloride groups to sulfonic acid. No observable adsorption at 1051 or 1180 $cm^{-1}$ indicated that the hydrolyzed chlorosulfonated polyolefin contained no detectable potassium sulfonate salt groups. A broad peak at 3300 $cm^{-1}$ also indicated that the $-SO_2Cl$ functional groups had been converted to the sulfonic acid. The isolated polymer was further characterized by Atomic Absorption and found to contain only 4 ppm of potassium. The absence of significant potassium together with the FTIR data shows that the resulting polymer contained predominately sulfonic acid groups.

Comparative Example A

A comparative partially neutralized chlorosulfonated polyolefin elastomer was prepared by mixing the remaining partially hydrolyzed polyolefin solution prepared in Example 1 on a Silverson homomixer at 3,000 rpm for 4 minutes as 3 grams of a 10 wt. % aqueous potassium hydroxide solution (2.1 moles KOH/mole of polymer sulfur and 59.9 moles water/mole of polymer sulfur) was added. The resulting partially neutralized polymer solution became viscous and milky but remained fluid upon addition of the KOH solution. However, several minutes after agitation was stopped, the solution thickened into a jelly-like consistency. The jelly-like structure could be easily broken down (by agitation) to a viscous fluid consistency, but reverted to the jelly-like consistency again several minutes after stopping the agitation.

A 10 gram sample of the resulting jelly-like solution was taken and the polymer isolated by micro-precipitation and washing as in Example 1, but using 1,000 ml of the 1:1:0.5 mixture of methanol, acetone and water in the initial step. After filtering and drying for 1 hour at 121° C., a thin film of the resulting polymer showed strong infrared peaks at 1051 $cm^{-1}$ and 1180 $cm^{-1}$, but no absorption at 1130, 1014 or 3300 $cm^{-1}$, indicating that the sulfonic acid groups and any residual sulfonyl chloride groups had been converted to the sulfonate potassium salt. Furthermore, atomic absorption of the resulting polymer showed 1.5 wt. % potassium, indicating the presence of essentially all potassium sulfonate groups formed by neutralization of polymer sulfonic acid groups.

Example 2

A partially hydrolyzed chlorosulfonated polyolefin elastomer of the invention was prepared using essentially the same procedure as Example 1, by adding 7.5 grams of the chlorosulfonated ethylene propylene copolymer to 142.5 grams of a solvent mixture composed of 90 wt. % carbon tetrachloride and 10 wt. % chloroform and mixed for one hour on a shaker, resulting in a 5 wt. % clear solution. However, in this Example, 7 grams of the 20 wt. % potassium oleate solution (OCD 607 from Mead Westvaco) was used (1.7 moles potassium salt/mole of polymer sulfur and 115.1 moles water/mole of polymer sulfur) in the hydrolysis of the chlorosulfonated polyolefin.

A 25 gram sample of the hydrolyzed polymer solution was taken and micro-precipitated using the procedure of Example 1, by pouring the solution gradually into 500 ml of a 1:1 mixture of acetone and methanol in a Waring blender, resulting in a fine white powder which was washed 3 times with 100 ml aliquots of water. The powder was filtered and dried for 1 hour at 100° C. in a vacuum desiccator and then set aside for further testing. A thin pressed film of the polymer showed infrared bands at 1014 $cm^{-1}$ and 1130 $cm^{-1}$ and a broad peak at 3300 $cm^{-1}$, indicating conversion of the sulfonyl chloride groups to sulfonic acid. Absence of a significant peak at 1166 $cm^{-1}$ indicated that essentially all of the sulfonyl chloride had been hydrolyzed.

Comparative Example B

A partially neutralized chlorosulfonated polyolefin elastomer was prepared using the procedure in Comparative Example A by mixing the remaining solution of hydrolyzed polyolefin prepared in Example 2 while adding 1.5 g of 20 wt. % aqueous KOH solution (2.3 moles KOH/mole of polymer sulfur and 65.2 moles water/mole of polymer sulfur).

A 25 gram sample of the resulting neutralized polyolefin jelly-like solution was first agitated to form a pourable solution and then micro-precipitated (using the procedure in Comparative Example A) in 1,000 ml of a 1:1 (vol.) mixture of acetone and methanol. The powder was then washed, filtered and dried at 121° C. for 1 hour to remove associated water and set aside for further testing.

A thin pressed film of the neutralized polymer showed strong FTIR bands at 1180 and 1051 $cm^{-1}$ and absence of bands at 1014 $cm^{-1}$ and 1130 $cm^{-1}$. This information indicated formation of the potassium salt.

Example 3

The powdered polymers from Example 2 and Comparative Example B were each added at a 1 wt. % level to mineral oil (Bio-base 360 from Shrieve Chemical Co.), by adding 1 gram of polymer to 99 grams of Biobase in a screw cap bottle. The bottle was placed on a shaker at room temperature to bring about dissolution in the mineral oil. After one hour, the sulfonic acid polymer of the invention from Example 2 was dissolved in the mineral oil and the comparative sulfonate potassium salt polymer from Comparative Example B was not dissolved. After 24 hours on the shaker at room temperature, the comparative polymer from Comparative Example B was unexpectedly still not dissolved.

Example 4

1 wt. % solution samples of the polymer of the invention from Example 2 and the neutralized polyolefin from Comparative Example B were prepared as in Example 3 above. The samples were placed in an oven until the solution temperature had reached 70° C. (30 minutes). The samples were then taken from the oven and placed on a shaker. After only 5 minutes on a shaker, the sulfonic acid polymer of the invention (Example 2) was completely dissolved whereas the comparative sulfonate potassium salt polymer from Comparative Example B was only swollen and partially dissolved with a grainy appearance. With continued heating and shaking, the Comparative Example B polymer required an additional 6 hours to essentially dissolve (a few particles remained).

This demonstrates the unexpected improved solubility of a partially hydrolyzed chlorosulfonated polyolefin elastomer of the invention over a comparative partially neutralized chlorosulfonated polyolefin elastomer.

Example 5

A low density polyethylene homopolymer (LDPE EC812, available from Westlake Chemical Corporation, having a Melt Index (condition 190° C./2.16 kg) of 200.0 g/10 minute (min.), a density of 0.909 g/cubic centimeter (cc) and a Mw/Mn of 41.6) was chlorosulfonated by substantially the same process as that disclosed in WO 2008/123989 except that no pressure was applied to the system and excess gas was liberated during the process. The resulting chlorosulfonated polyolefin contained 8.9 wt % combined chlorine and 1.3 wt % sulfur.

A partially hydrolyzed chlorosulfonated polyolefin elastomer of the invention was prepared using the procedure of Example 1, by adding 5 grams of the chlorosulfonated low density polyethylene to 142.5 grams of a solvent mixture composed of 90 wt. % carbon tetrachloride and 10 wt % chloroform and mixed for one hour on a shaker, resulting in a 5 wt. % clear solution. The solution was stirred with a Silverson homo-mixer at 3,000 rpm for 1 minute to ensure complete dissolution. In a separate container, 2 grams of pentaerythritol was dissolved in 5 ml of water. The pentaerythritol solution was then added to the polymer solution and the mixture was stirred at 5,000 rpm for 5 minutes (9.1 moles pentaerythritol per mole of polymer sulfur and 136.7 moles water per mole of polymer sulfur). The solution increased in viscosity during stirring, but became more viscous 30 minutes after mixing had been stopped. There was no indication of a jelly-like appearance in the solution of hydrolyzed polyolefin.

25 grams of the solution was micro-precipitated (using the procedure in Comparative Example A) in 500 ml of methanol/acetone solution and then washed three times with 100 ml aliquots of 1:1:1 (vol.) methanol:acetone:water to remove excess pentaerythritol. The resulting hydrolyzed polymer powder was air dried for 2 hours at 100° C. in a vacuum desiccator. The resulting white powder was pressed into a film and analyzed by FTIR. Strong absorption peaks at 1014, 1130 $cm^{-1}$ and a broad peak at 3300 $cm^{-1}$ indicated presence of polymer sulfonic acid. Also a relatively small peak appeared at 1166 $cm^{-1}$. A ratio of the peak heights at 1014 and 1166 $cm^{-1}$ indicated about 90% of the sulfonyl chloride had been converted to sulfonic acid.

What is claimed is:

1. A chlorosulfonated polyolefin composition comprising at least one chlorosulfonated polyolefin having 0.5 to 10 weight percent chlorine, 0.25 to 5 weight percent sulfur, based on total weight of said chlorosulfonated polyolefin, and a plurality of —$SO_3H$ groups, and wherein said chlorosulfonated polyolefin is produced from a polyolefin base resin selected from the group consisting of i) a low density polyethylene and ii) a linear copolymer comprising copolymerized units of 45 to 80 weight percent ethylene and 55 to 20 weight percent, based on total weight of said linear copolymer, of an alpha-olefin having 3 to 20 carbon atoms, said linear olefin copolymer having a ratio of Mw/Mn less than 3.5.

2. A chlorosulfonated polyolefin composition of claim 1 wherein said base resin is a linear copolymer and wherein said alpha-olefin is selected from the group consisting of octene-1, butene-1 and propylene.

3. A chlorosulfonated polyolefin composition of claim 2 wherein said alpha-olefin is octene-1.

4. A chlorosulfonated polyolefin composition of claim 2 wherein said alpha-olefin is butene-1.

5. A chlorosulfonated polyolefin composition of claim 2 wherein said alpha-olefin is propylene.

6. A chlorosulfonated polyolefin composition of claim 1 wherein said linear olefin copolymer has a density between 0.85 and 0.91 g/cm$^3$.

7. A chlorosulfonated polyolefin composition of claim 1 wherein said base resin is low density polyethylene.

8. A chlorosulfonated polyolefin composition of claim 7 wherein said low density polyethylene has a Melt Index, condition 190° C., 2.16 kg, between 2000 and 1 gram/10 minutes and a density between 0.890 and 0.920.

9. A chlorosulfonated polyolefin composition of claim 1 wherein said weight percent chlorine is between 0.75 and 8 and wherein said weight percent sulfur is between 0.35 and 3.

10. A chlorosulfonated polyolefin composition of claim 9 wherein said weight percent chlorine is between 1 and 5 and wherein said weight percent sulfur is between 0.5 and 2.

11. A chlorosulfonated polyolefin composition of claim 1 comprising at least 2 chlorosulfonated polyolefins, each having 0.5 to 10 weight percent chlorine, 0.25 to 5 weight percent sulfur, based on total weight of each said chlorosulfonated polyolefin, and a plurality of —$SO_3H$ groups and wherein each of said chlorosulfonated polyolefins is produced from a different polyolefin base resin selected from the group consisting of i) a low density polyethylene and ii) a linear copolymer comprising copolymerized units of 45 to 80 weight percent ethylene and 55 to 20 weight percent, based on total weight of said linear copolymer, of an alpha-olefin having 3 to 20 carbon atoms, said linear olefin copolymer having a ratio of Mw/Mn less than 3.5.

* * * * *